United States Patent
Takahashi

(10) Patent No.: US 10,970,288 B2
(45) Date of Patent: Apr. 6, 2021

(54) ANALYSIS DEVICE

(71) Applicant: NEC Corporation, Tokyo (JP)

(72) Inventor: Tsubasa Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 71 days.

(21) Appl. No.: 16/481,520

(22) PCT Filed: Feb. 9, 2017

(86) PCT No.: PCT/JP2017/004676
§ 371 (c)(1),
(2) Date: Jul. 29, 2019

(87) PCT Pub. No.: WO2018/146761
PCT Pub. Date: Aug. 16, 2018

(65) Prior Publication Data
US 2019/0384769 A1   Dec. 19, 2019

(51) Int. Cl.
*G06F 16/2455*   (2019.01)
*G06F 16/901*   (2019.01)

(52) U.S. Cl.
CPC .... *G06F 16/24568* (2019.01); *G06F 16/9024* (2019.01)

(58) Field of Classification Search
CPC ............... G06F 16/24568; G06F 16/9024
See application file for complete search history.

(56) References Cited

U.S. PATENT DOCUMENTS

| | | | |
|---|---|---|---|
| 9,256,646 B2* | 2/2016 | Deshmukh | B29D 30/0681 |
| 9,299,082 B2* | 3/2016 | McConnell | G06F 16/24568 |
| 9,418,113 B2* | 8/2016 | Bishnoi | G06F 16/24568 |
| 9,972,103 B2* | 5/2018 | de Castro Alves | G06F 16/9024 |
| 10,007,704 B1* | 6/2018 | Carey | H04L 47/10 |
| 10,120,907 B2* | 11/2018 | de Castro Alves | G06F 16/24568 |

(Continued)

FOREIGN PATENT DOCUMENTS

| | | |
|---|---|---|
| JP | 2009-70065 A | 4/2009 |
| JP | 2013-8329 A | 1/2013 |
| WO | 2013/002107 A1 | 1/2013 |

OTHER PUBLICATIONS

Sun et al., "Window-based Tensor Analysis on High-dimensional and Multi-aspect Streams", 2007, pp. 1-5 (Year: 2007).*

(Continued)

*Primary Examiner* — Jorge A Casanova

(57) ABSTRACT

An analysis device of the present invention includes: a window length decision part that decides a window length of a data stream including tuples each including a timestamp and an observed value; a graph construction part that constructs a graph representing a preset relation between the tuples within a window obtained by dividing the data steam by the decided window length; a tensor construction part that constructs a tensor or a matrix equivalent to the tensor from a plurality of graphs constructed for a plurality of windows, respectively; a pattern extraction part that extracts a pattern from the tensor or the matrix equivalent to the tensor; and a difference extraction part that extracts a residual portion that does not match the extracted pattern, from the data stream. The window length decision part decides a new window length that is different from the previously decided window length.

14 Claims, 13 Drawing Sheets

(56) References Cited

U.S. PATENT DOCUMENTS

| | | | |
|---|---|---|---|
| 10,599,654 B2* | 3/2020 | Horen | G06Q 10/10 |
| 2019/0034519 A1* | 1/2019 | Xu | G06F 9/542 |

OTHER PUBLICATIONS

Sun et al., "Tensor Analysis on Multi-aspects Streams", 2007, pp. 165-184 (Year: 2007).*

Sun, "Incremental Pattern Discovery on Streams Graphs and Tensors", 2007, pp. 1-169 (Year: 2007).*

Gaber et al., "Mining Data Streams: A Review", SIGPOD Record, Jun. 2005, vol. 34, No. 2, pp. 18-26 (total 9 pages).

Thanawin Rakthanmanon et al., "Addressing Big Data Time Series: Mining Trillions of Time Series Subsequences Under Dynamic Time Warping", ACM Transactions on Knowledge Discovery from Data, Sep. 2013, vol. 7, No. 3, Article 10, pp. 10:1-10:31 (total 31 pages).

Hochreiter et al., "Long Short-Term Memory", Neural Computation, 1997, 9(8):1735-1780, pp. 1-32 (total 32 pages).

International Search Report for PCT/JP2017/004676 dated May 16, 2017.

* cited by examiner

Fig.3

| time | Alert type | src | dst |
|---|---|---|---|
| 1 | A | 100 | 101 |
| 2 | A | 100 | 111 |
| 3 | B | 101 | 200 |
| 4 | E | 444 | 555 |
| 5 | C | 200 | 100 |
| 6 | D | 100 | 155 |
| 7 | A | 300 | 303 |
| 8 | E | 666 | 777 |
| 9 | E | 666 | 888 |
| 10 | B | 303 | 915 |
| 11 | C | 915 | 300 |
| 12 | E | 444 | 999 |
| ... | ... | ... | ... |
| 19 | B | 111 | 120 |
| ... | ... | ... | ... |
| 24 | C | 120 | 120 |

Fig.5a

|   | A | B | C | D | E |
|---|---|---|---|---|---|
| A | 1 | 1 |   | 1 |   |
| B |   |   | 1 |   |   |
| C |   |   |   |   |   |
| D |   |   |   |   |   |
| E |   |   |   |   |   |

Fig.5b

|   | A | B | C | D | E |
|---|---|---|---|---|---|
| A |   | 1 |   |   |   |
| B |   |   | 1 |   |   |
| C |   |   |   |   |   |
| D |   |   |   |   |   |
| E |   |   |   |   | 1 |

Fig.5c

|   | A | B | C | D | E |
|---|---|---|---|---|---|
| A |   |   |   |   |   |
| B |   |   | 1 |   |   |
| C |   |   |   |   |   |
| D |   |   |   |   |   |
| E |   |   |   |   |   |

Fig.8
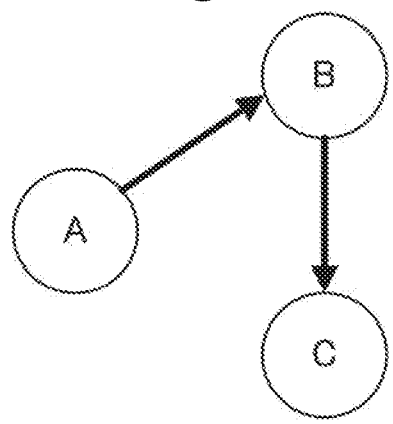
Fig.9
| time | Alert type | src | dst |
|---|---|---|---|
| 2 | A | 100 | 111 |
| 4 | E | 444 | 555 |
| 6 | D | 100 | 155 |
| 8 | E | 666 | 777 |
| 9 | E | 666 | 888 |
| 12 | E | 444 | 999 |
| ... | ... | ... | ... |
| 19 | B | 111 | 120 |
| ... | ... | ... | ... |
| 24 | C | 120 | 120 |
Fig.10
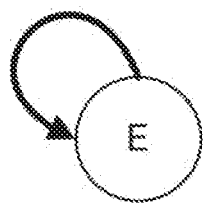

Fig.11a

|   | A | B | C | D | E |
|---|---|---|---|---|---|
| A |   |   |   |   |   |
| B |   |   |   |   |   |
| C |   |   |   |   |   |
| D |   |   |   |   |   |
| E |   |   |   |   | 2 |

Fig.11b

|   | A | B | C | D | E |
|---|---|---|---|---|---|
| A |   |   |   |   |   |
| B |   |   | 1 |   |   |
| C |   |   |   |   |   |
| D |   |   |   |   |   |
| E |   |   |   |   |   |

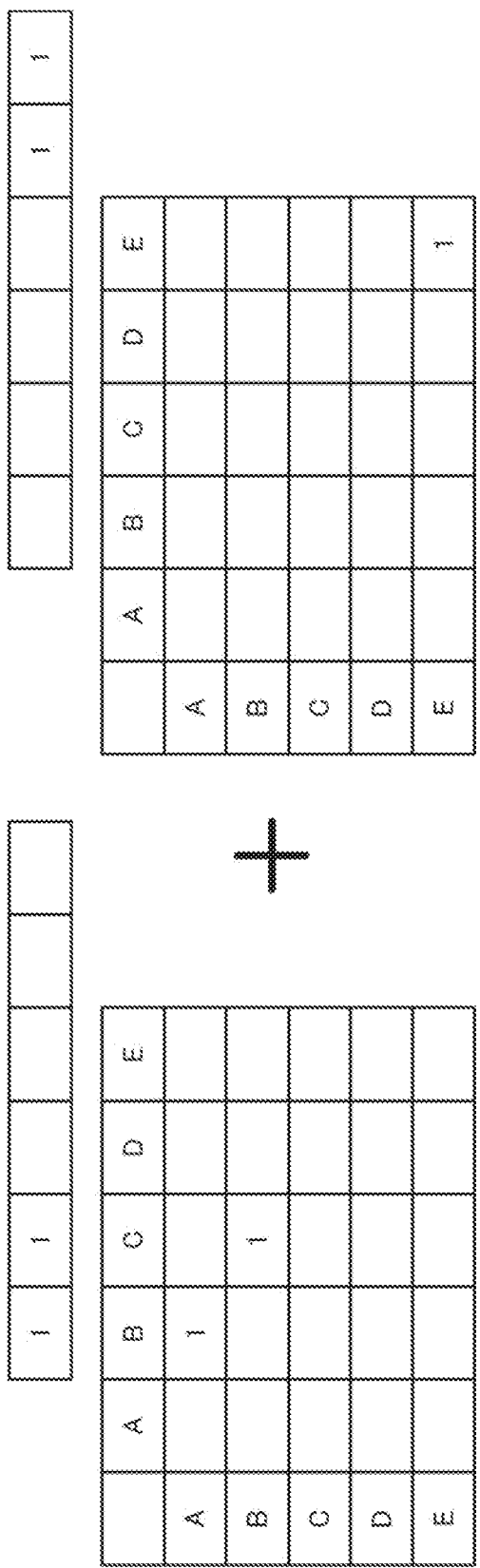

| time | Alert type | src | dst |
|---|---|---|---|
| 2 | A | 100 | 111 |
| 6 | D | 100 | 155 |
| ... | ... | ... | ... |
| 19 | B | 111 | 120 |
| ... | ... | ... | ... |
| 24 | C | 120 | 120 |

|   | A | B | C | D | E |
|---|---|---|---|---|---|
| A |   | 1 |   |   |   |
| B |   |   | 1 |   |   |
| C |   |   |   |   |   |
| D |   |   |   |   |   |
| E |   |   |   |   |   |

| time | Alert type | src | dst |
|---|---|---|---|
| 6 | D | 100 | 155 |

ANALYSIS DEVICE

This application is a National Stage Entry of PCT/JP2017/004676 filed on Feb. 9, 2017, the contents of all of which are incorporated herein by reference, in their entirety.

TECHNICAL FIELD

The present invention relates to an analysis device. More specifically, the present invention relates to an analysis device which analyzes a data stream.

BACKGROUND ART

A sensor device such as a network intrusion detection device (IDS) and a factory temperature sensor generates, from hour to hour, states and values observed thereby (observed values) so as to be correlated to information such as observation time thereof (timestamps). By streaming data including such observed values and timestamps, it is possible to constantly monitor a network, a factory, and so on. A sequence of streamed data including observed values and timestamps is called a data stream. That is to say, the abovementioned monitoring is performed by acquiring and observing a data stream.

Further, by analyzing a data stream, it is possible to perform a status check such as determining whether a monitoring target is normal and finding a suspicious behavior. A data stream is, for example, a tweet in microblogging such as a Twitter, a log of proxy server, and an alert log of IDS.

A data stream contains various events. Therefore, in order to understand an event occurring in a data stream, it is required to extract a set of one or more "meaningful" data (an observed value and a timestamp and other information) such as "often appear" and "abnormal." Such a set of one or more "meaningful" data is called an "event."

An event occurring in a data stream does not always appear at the same cycle or time. Such an event may appear within one hour, within ten minutes or after one day depending on time. This may occur when an abnormality occurs in a target device or when an occurrence time of a pattern is arbitrarily distorted by someone as in a cyberattack on a network.

On the other hand, a data stream has a characteristic of being infinite or very long in length with respect to a time direction. Therefore, at the time of analysis of a data stream, by focusing on an event appearing in a certain time W, a pattern is found. For example, it is a temperature change occurring within 24 hours. Moreover, by dividing a data stream by a certain time W, a pattern appearing in common in a plurality of subsequences after division is found. For example, assuming W=24 hours, it is possible to find an average pattern of daily temperature change and a suspicious behavior on a network that often appears at a specific time.

Non-Patent Document 1: Gaber, Mohamed Medhat, Arkady Zaslaysky, and Shonali Krishnaswamy. "Mining data streams: a review." ACM Sigmod Record 34.2 (2005): 18-26.

Non-Patent Document 2: Rakthanmanon, Thanawin. "Addressing Big Data Time Series: Mining Trillions of Time Series Subsequences Under Dynamic Time Warping". ACM Transactions on Knowledge Discovery from Data. 7(3): 10:1-10:31

Non-Patent Document 3: Sepp Hochreiter; Jurgen Schmidhuber (1997). "Long short-term memory". Neural Computation. 9(8): 1735-1780

However, in a case where temporal distortion occurs as described above, there is a problem that it is impossible to identify an event completed at time exceeding the division time W with another identical event by the analysis method for a subsequence based on the time W. Moreover, even if there is no distortion, it is required to know in advance how long the division time W is.

Therefore, there is a problem that it is impossible by an existing data stream analysis method to find an event which may contain distortion from a data stream or identify an event which should be originally identified with another identical one, without previous knowledge on a data stream.

Non-Patent Document 1 describes various methods for analyzing a data stream. It is general when analyzing a data stream to use a window or a sliding window, and the length of the window has a great influence on the accuracy of analysis, and so on.

For time-series data (data of waveform type), a method for eliminating temporal distortion by using dynamic time warping is known in a document such as Non-Patent Document 2. However, a data stream assumed in the present invention is not necessarily waveform type and a plurality of events overlap, so that it is impossible to apply the concept of dynamic time warping. Likewise, it is difficult to apply a time series model by a linear model such as AR.

Further, the n-gram model used in natural language processing is known as a means for representing a pattern between words before and after included in the neighborhood by using a statistical model. However, in a data stream, tuples forming events may appear at a very long interval and also a plurality of events are contained, so that it is difficult to catch the relation between the tuples forming the events by using the n-gram that considers the neighborhood. It is also difficult to solve it by a method using a memory such as LSTM shown in Non-Patent Document 3.

SUMMARY

Accordingly, an object of the present invention is to provide an information processing device which can solve the abovementioned problem that it is impossible to detect an event from a data stream.

An analysis device as an aspect of the present invention includes: a window length decision part configured to decide a window length of a data stream including tuples each including a timestamp and an observed value; a graph construction part configured to construct a graph representing a preset relation between the tuples within a window obtained by dividing the data steam by the decided window length; a tensor construction part configured to construct a tensor or a matrix equivalent to the tensor from a plurality of graphs constructed for a plurality of windows, respectively; a pattern extraction part configured to extract a pattern from the tensor or the matrix equivalent to the tensor; and a difference extraction part configured to extract a residual portion that does not match the extracted pattern, from the data stream. The window length decision part is configured to decide a new window length that is different from the previously decided window length. The graph construction part is configured to construct a graph representing a preset relation between the tuples within a window obtained by dividing the residual portion extracted from the data stream by the new window length having been decided.

Further, a computer program as another aspect of the present invention includes instructions for causing an information processing device to realize: a window length decision part configured to decide a window length of a data stream including tuples each including a timestamp and an observed value; a graph construction part configured to construct a graph representing a preset relation between the tuples within a window obtained by dividing the data steam by the decided window length; a tensor construction part configured to construct a tensor or a matrix equivalent to the tensor from a plurality of graphs constructed for a plurality of windows, respectively; a pattern extraction part configured to extract a pattern from the tensor or the matrix equivalent to the tensor; and a difference extraction part configured to extract a residual portion that does not match the extracted pattern, from the data stream. The computer program also includes instructions for causing the information processing device to realize that: the window length decision part decides a new window length that is different from the previously decided window length; and the graph construction part constructs a graph representing a preset relation between the tuples within a window obtained by dividing the residual portion extracted from the data stream by the new window length having been decided.

Further, an analysis method as another aspect of the present invention includes: deciding a window length of a data stream including tuples each including a timestamp and an observed value; constructing a graph representing a preset relation between the tuples within a window obtained by dividing the data steam by the decided window length; constructing a tensor or a matrix equivalent to the tensor from a plurality of graphs constructed for a plurality of windows, respectively; extracting a pattern from the tensor or the matrix equivalent to the tensor; and extracting a residual portion that does not match the extracted pattern, from the data stream. The analysis method further includes: deciding a new window length that is different from the previously decided window length, constructing a graph representing a preset relation between the tuples within a window obtained by dividing the residual portion extracted from the data stream by the new window length having been decided, and again executing the constructing the tensor, the extracting the pattern and the extracting the residual portion.

With the configurations described above, the present invention enables detection of an event from a data stream.

BRIEF DESCRIPTION OF DRAWINGS

FIG. 3 is a view showing an example of a data stream;

FIG. 5 is a view showing an example of representing a graph generated from part of a data stream in matrix;

FIG. 6 is a view showing a tensor generated from a set of the matrices shown in FIG. 5;

FIG. 7 is a view showing an example of a pattern extracted from the tensor shown in FIG. 6;

FIG. 8 is a view representing the pattern shown in FIG. 7 as a graph;

FIG. 9 is a view showing a residual portion derived from the data stream shown in FIG. 3 and the pattern shown in FIG. 7;

FIG. 10 is a view showing an example of a graph generated from part of the residual portion of the data stream shown in FIG. 9;

FIG. 11 is a view representing the graph shown in FIG. 10 in matrix;

FIG. 12 is a view showing a pattern extracted from the pattern shown in FIG. 7 and the tensor generated from the matrix shown in FIG. 11;

EXAMPLE EMBODIMENTS

Figure 1:
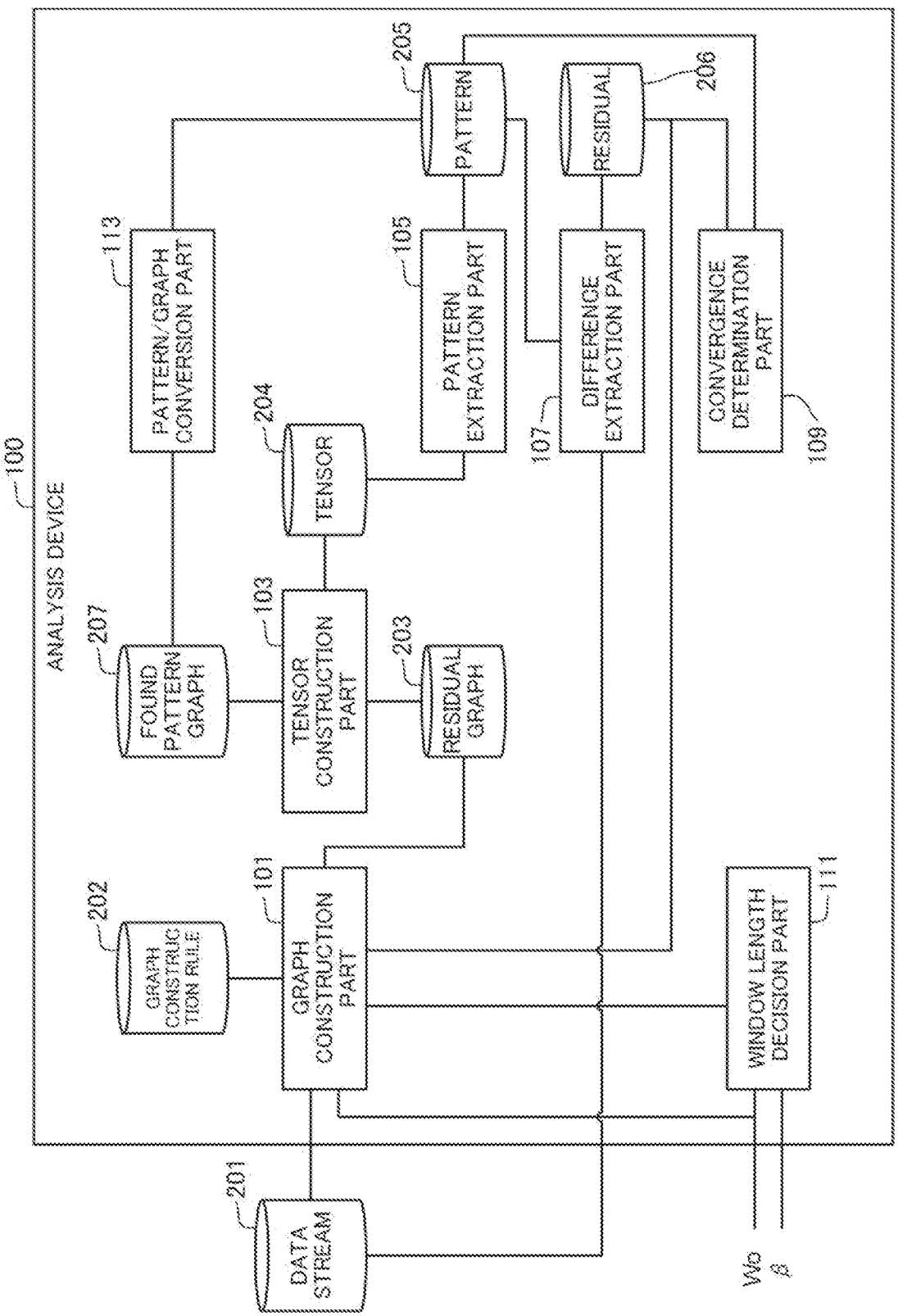
FIG. 1 is a block diagram showing the configuration of an analysis device in a first example embodiment of the present invention.

Below, an example embodiment of the present invention will be described in detail with reference to the drawings. The respective drawings describe the example embodiment of the present invention. However, the present invention is not limited to the description of the respective drawings. The same components in the respective drawings will be denoted by the same reference numerals and repetitive description thereof may be omitted. In the drawings used for the following description, illustration of a part which does not relate to the description of the present invention may be omitted.

First Example Embodiment

Figure 2:
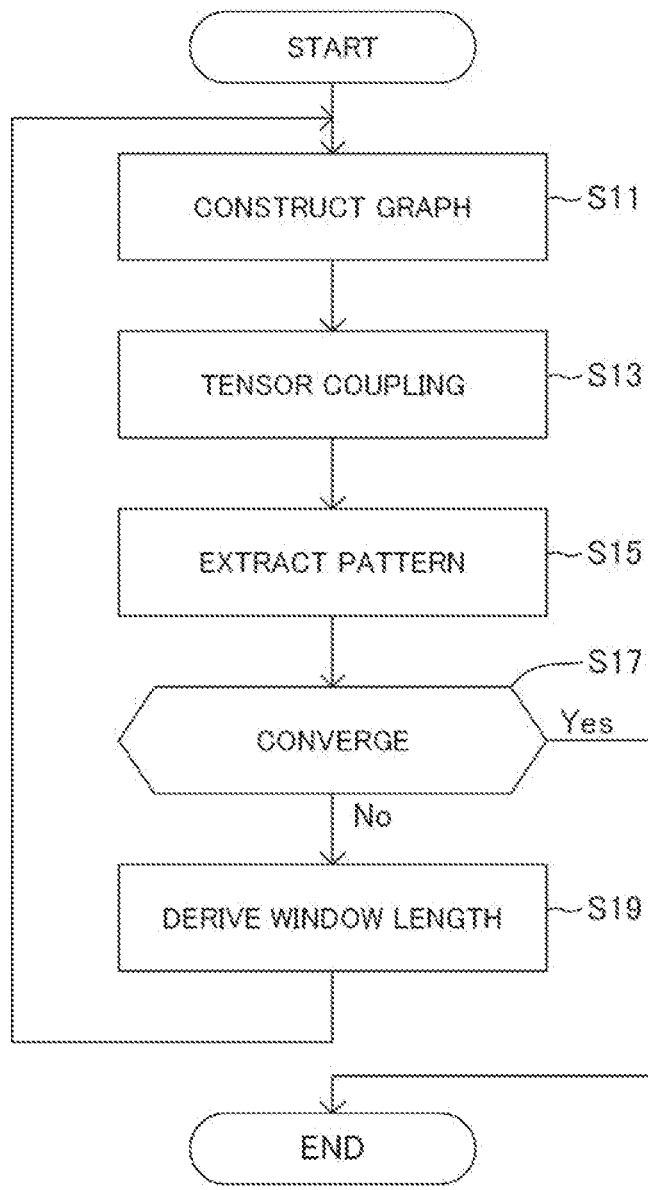
FIG. 2 is a flowchart showing a processing procedure in the first example embodiment of the present invention.

A first example embodiment of the present invention will be described with reference to FIGS. 1 to 17. FIG. 1 is a view for describing the configuration of an analysis device in the first example embodiment, and FIG. 2 is a flowchart showing an aspect of analysis processing. FIGS. 3 to 17 are views showing an example of each information by analysis processing.

As shown in a block diagram of FIG. 1, an analysis device 100 of the present invention includes a graph construction part 101, a tensor construction part 103, a pattern extraction part 105, a difference extraction part 107, a convergence determination part 109, a window length decision part 111, and a pattern/graph conversion part 113. Moreover, the analysis device 100 is configured so that a data stream 201 can be input, and configured so that a graph construction rule 202, a residual graph 203, a tensor 204, a pattern 205, a residual 206 and a found pattern graph 207 can be stored.

The respective parts 101 to 111 included by the analysis device 100 in this example embodiment may be configured by a hardware circuit, or may be constructed by installation of a program into a central processing unit (CPU) installed in the information processing device.

First, the outline of the abovementioned parts 101 to 111 will be described. The respective parts 101 to 111 will be detailed in the following description of operation.

First, a data stream to be processed in the present invention includes a tuple containing a timestamp and an observed value as will be described later.

The window length decision part 111 first decides a window length $W_{i+1}$ to be used in next iteration by using an initial window length $W_0$, a window length $W_i$, and a window length magnification $\beta$. For example, the window length decision part 111 decides as in $W_{i+1}=\beta W_i=\beta^i W_0$.

The graph construction part 101 divides an input data stream (201) or part thereof (a residual portion) by the window length Wi. Then, the graph construction part 101 constructs a graph representing a preset relation between tuples with respect to each of partial sequences (windows) obtained by dividing the input data stream or part thereof. To be specific, the graph construction part 101 creates a graph which is a tuple per window with reference to the graph construction rule (202), and outputs a column GΔ (203) of the created graphs.

Further, in a case where the convergence determination part 109 determines that processing on a data stream does not converge as will be described later, the graph construction part 101 constructs a graph in the same manner as described above on a residual (206) (a residual portion) extracted by the difference extraction part 107.

The tensor construction part 103 stacks a plurality of graph columns constructed for the respective windows by the graph construction part 101 to construct and output a tensor Z204. At this time, as will be described later, the tensor construction part 103 constructs a tensor Z by stacking a graph GP (207) obtained by converting a pattern P output by the pattern/graph conversion part 113 in the past and a graph column GΔ (203) constructed most recently by the graph construction part 101. Alternatively, the tensor construction part 103 may construct a matrix Y equivalent to the tensor Z obtained by matricization (unfolding) of the tensor Z from the graph GP and the graph column GΔ.

The pattern extraction part 105 extracts a main pattern P (205) from the tensor Z (or the matrix Y) constructed by the tensor construction part 103. For pattern extraction, it is possible to use any analysis method, such as tensor factorization, of extracting one or more patterns or a representative feature value from a predetermined tensor. For example, for the matrix Y, it is also possible to use any analysis method of extracting one or more patterns or a representative feature value by matrix factorization such as principal component analysis and singular value decomposition, or manifold learning, or the like.

The difference extraction part 107 extracts a residual Δ (206) (a residual portion), which is a subset of the input data stream that does not apply to the pattern P extracted by the pattern extraction part 105 from the data stream. The residual Δ is a target of graph construction in next iteration by the abovementioned graph construction part 101 in a case where the processing on the data stream does not converge.

The convergence determination part 109 determines whether any more pattern cannot be extracted in the analysis by the analysis device 100. That is to say, the convergence determination part 109 determines whether or not the processing on the data stream has converged. When it is determined that no more pattern can be extracted, the operation of the analysis device 100 is ended. On the other hand, when the convergence determination part 109 determines that the residual Δ is left sufficiently and a still another pattern can be extracted, that is, determines that the processing has not converged, next iteration is executed by using the residual Δ as described above.

Then, when the convergence determination part 109 determines that the processing has not converged, the window length decision part 111 decides a window length $W_{i+1}$ to be used in next iteration by using the initial window length $W_0$, the window length $W_i$, and the window length magnification $\beta$. For example, the window length decision part 111 decides as in $W_{i+1}=\beta W_i=\beta^i W_0$. Consequently, the window length decision part 111 decides a new window length which is different from the window length decided in the past. The graph construction part 101 performs graph construction on the residual Δ (206) of the data stream by using this new window length.

The pattern/graph conversion part 113 converts the pattern P (205) extracted by the pattern extraction part 105 to a graph column (207) containing one or more graphs. At this time, the respective graphs represent independent patterns.

[Operation]

Next, the operation of the analysis device 100 with the abovementioned configuration will be described with reference to the flowchart of FIG. 2 and the other drawings.

First, assuming an input data stream is a residual Δ, the graph construction part 101 performs construction of a graph on the residual Δ and generates a graph column GΔ (step S11). FIG. 3 shows the input data stream. The data stream includes a plurality of tuples each containing "time" as a timestamp and "Alert type," "src (transmission source)" and "dst (destination)" as observed values.

Herein, it is assumed that the window length $W_0=6$ (the initial window length) and the window length magnification $\beta=2$. The data stream shown in FIG. 3 is divided into partial sequences (windows) in which the values of attribute "time" are [1, 6], [7, 12], [13, 18] and [19, 24]. Then, the graph construction part 101 constructs a graph representing a relation between the tuples in each of the partial sequences.

The graph construction rule is set and stored in advance and, in this example embodiment, the following two rules are assumed.

(1) Between tuples of ti<tj with regard to attribute "time," if destination "dst" of the tuple of ti is the same as source "src" of the tuple of tj, a side is put from "alert type" of ti to "alert type" of tj.

(2) Between tuples of ti<tj with regard to attribute "time," if source "src" of the tuple of ti is the same as source "src" of the tuple of tj, a side is put from "alert type" of ti to "alert type" of tj.

The abovementioned graph construction rules are examples, and the graph construction rule is not limited to such rules and may be any rule.

Figure 4A:
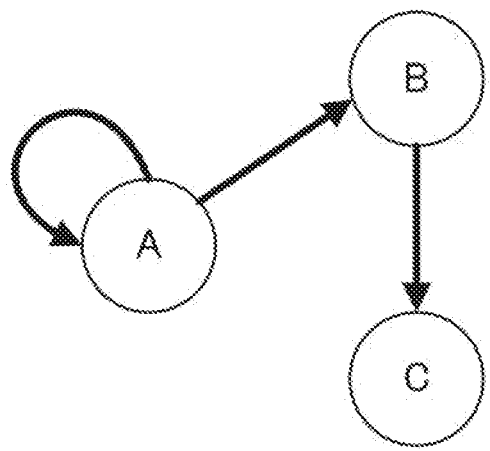
FIG. 4 is a view showing an example of a graph generated from part of a data stream.
Figure 4B:
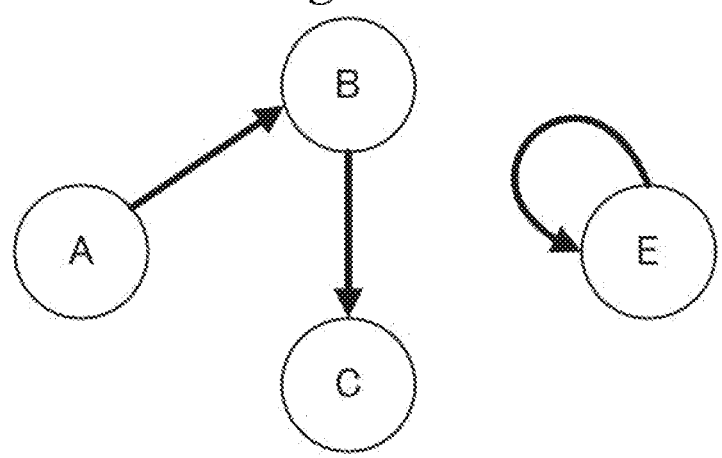

Searching for tuples that meet the abovementioned graph construction rules and representing a temporal relation between the tuples by a directed graph, it is possible to construct directed graphs shown in FIGS. 4A and 4B, respectively, from [1, 6] and [7, 12]. The graphs shown in FIGS. 4A and 4B are equivalent to matrices shown in FIGS. 5A and 5B, respectively. The respective matrices show that, when a side can be put once from one "alert type" to another "alert type," 1 is added to the cells. A cell with no value shows that the number of sides is 0. The number of times that a side can be put as shown in FIGS. 5A and 5B may be assigned as a weight onto the sides of the graphs of FIGS. 4A and 4B.

Further, in FIGS. 4A, 4B, 5A and 5B, values stored on the side and in the cell may be calculated values obtained based on the number of times that the side can be put. For example, a value divided by the total number of sides coming out of certain "alert type" (a value normalized by an outdegree) may be assigned.

Subsequently, the tensor construction part 103 generates a tensor Z constructed by stacking the graph column GΔ output by the graph construction part 101 and a graph column GP output by the pattern/graph conversion part 113 as will be described later (step S13). In a case where a graph GP converted from the pattern P is not present, that is, empty, the tensor construction part 103 generates a tensor for only the graph column GΔ constructed by the graph construction part 101.

Figures 6, 7:
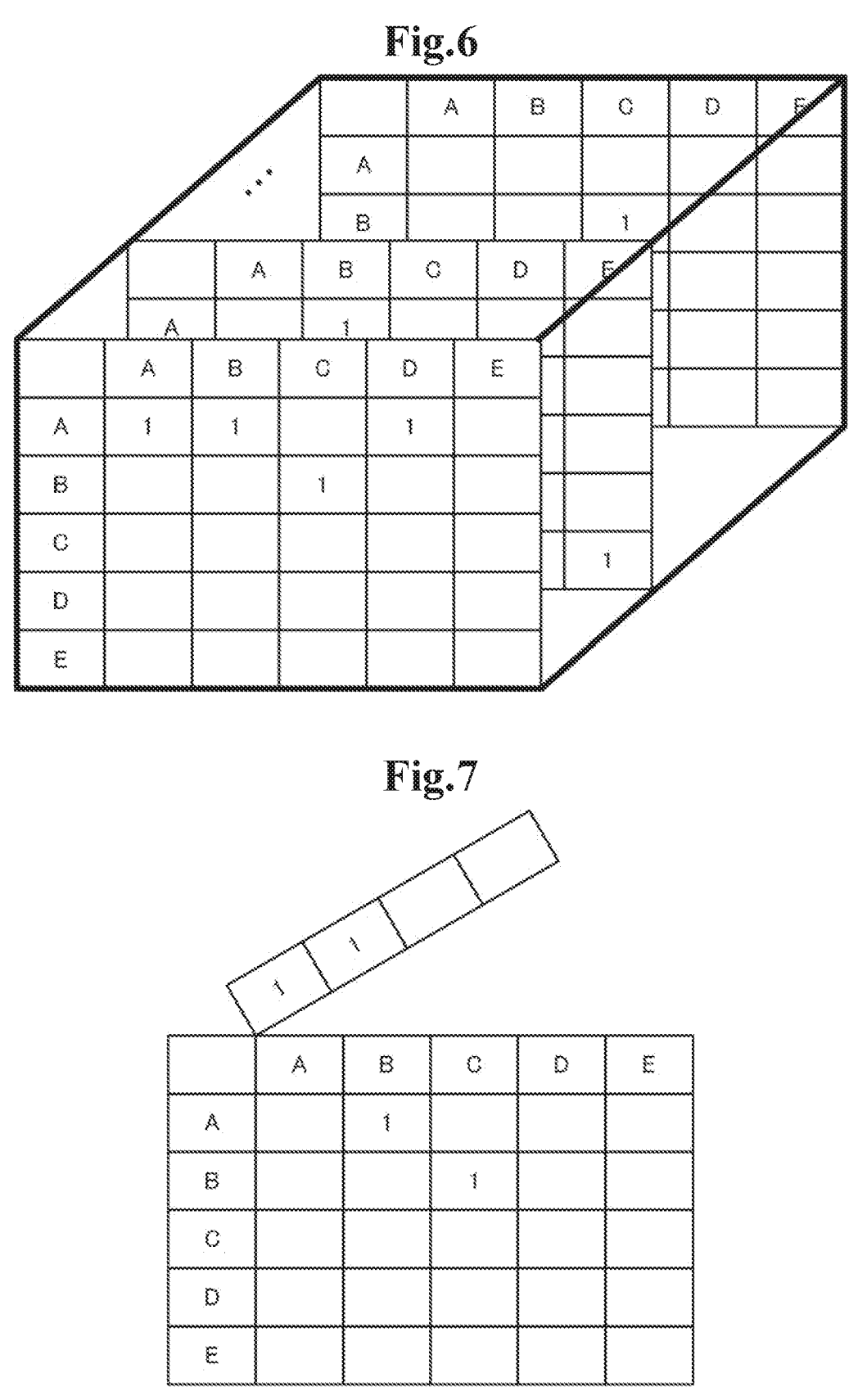

In the first iteration, the pattern P has not been extracted yet, so that the graph column GP is not present. Therefore, the tensor construction part 103 constructs a tensor for FIGS. 5A, 5B and 5C generated by the graph construction part 101. Herein, the tensor construction part 103 generates a tensor Z as shown in FIG. 6 by arranging and stacking graph columns (matrix columns) of the respective windows obtained by dividing by the window length in ascending order of the value of attribute "time."

Subsequently, the pattern extraction part 105 extracts a main pattern P by performing pattern extraction by tensor decomposition or the like on the tensor Z generated by the tensor construction part 103. When the pattern P is extracted, the difference extraction part 107 compares the input original data stream with the pattern P and derives a residual Δ that is a data stream subset that does not match the pattern P (step S15).

As pattern extraction by the pattern extraction part 105, it is possible to use tensor factorization by the Parafac (CP decomposition) method. FIG. 7 shows an example of the pattern P obtained by Parafac. A matrix in FIG. 7 shows a pattern which appears in common or plural times in FIGS. 5A, 5B and 5C, which is equivalent to a directed graph of FIG. 8. Moreover, a 1×4 vector described in the diagonal direction in FIG. 7 indicates at which time divided by the window length the pattern appears. In FIG. 7, value 1 is stored in the first and second cells. This shows that the pattern shown by the matrix of FIG. 7 is present at time [P1, 6] and [7, 12].

Further, as a method for limiting the pattern P output by tensor decomposition to a main pattern, it is possible to use sparse tensor decomposition that introduces sparse estimation, which is a method of making an obtained pattern P sparse (more 0). Moreover, a number k of latent components that form a main pattern may be decided based on an information criterion such as the MDL theory and BIC. The pattern P shown in FIG. 7 is an example of a pattern obtained by sparse tensor decomposition. It should be noted that the example is shown with simple values so as to give priority to the ease of description rather than accurate description of values obtained by actual sparse tensor decomposition.

The oriented graph shown in FIG. 8 is a graph column GP generated from the pattern P by the pattern/graph conversion part 113. In a case where the pattern P is empty (a column with size 0), conversion from the pattern P to the graph column GP by the pattern/graph conversion part 113 is not performed.

Subsequently, the difference extraction part 107 obtains a residual Δ that is a data stream subset that does not match the pattern P, from the data stream by using the pattern P. Herein, the difference extraction part 107 obtains a residual Δ shown in FIG. 9 from the data stream shown in FIG. 3 and the pattern P shown in FIG. 7.

Then, the convergence determination part 109 determines whether or not processing on the data stream has converged, that is, whether or not to stop operation of the analysis device 100, in accordance with a condition such that the pattern P has not changed since the last pattern extraction and the residual Δ is empty (step S17).

In a case where the operation is not stopped, the window length decision part 111 derives the window length $W_{i+1}$ to be used in next iteration (step S19). Herein, a sufficient number of tuples are left in the residual Δ shown in FIG. 9, so that the operation is not stopped. At this time, a new window length $W_1$ in the next iteration is "12" based on $W_0=6$ and $β=2$. Then, by using the new window length $W_1$, in the same manner as described above, the processing by the graph construction part 101, the tensor construction part 103, the pattern extraction part 105, the difference extraction part 107, the convergence determination part 109 and so on is executed again.

Figures 11A, 11B:
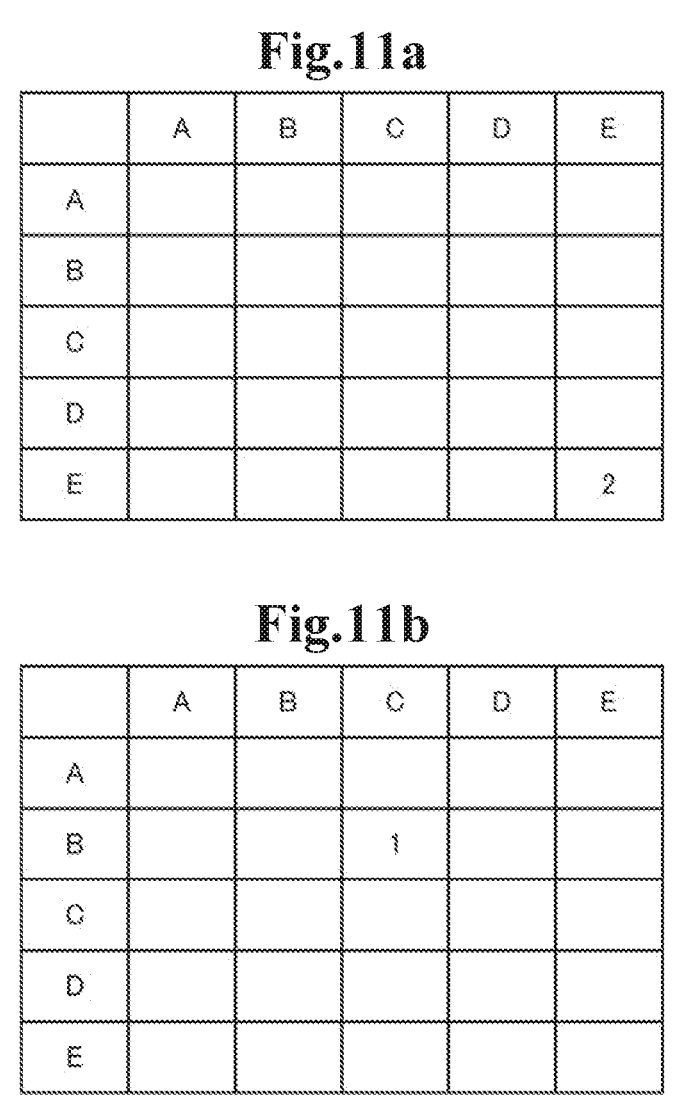

In the second iteration, from the residual Δ shown in FIG. 9, a graph shown in FIG. 10 is generated in time [1, 12] and a matrix shown in FIG. 11A is generated. Likewise, a matrix shown in FIG. 11B is generated in time [13, 24].

Furthermore, what is obtained by converting a pattern P of the first iteration into a tensor shown in FIG. 7 as ΔP is generated, or a graph column is generated. What is obtained by converting FIG. 7 into a tensor is equivalent to what is obtained by taking an outer product of the matrix and vector shown in FIG. 7. Therefore, in the second iteration, the tensor construction part 103 generates a tensor Z generated by stacking what is obtained by taking an outer product of the matrix and vector shown in FIG. 7 and the matrices shown in FIGS. 11A and 11B.

Furthermore, in the second iteration, the pattern extraction part 105 extracts a pattern P shown in FIG. 12 from the tensor Z. The pattern P shown in FIG. 12 represents a major pattern in the tensor Z by the sum of two terms. In the first term, the same pattern as the pattern extracted in the iteration 1 is extracted, and a 1×6 vector is provided. The 1×6 vector shows how often the pattern appears at time [1, 6], [7, 12], [13, 18] and [19, 24] obtained by dividing by $W_0=6$ in the first iteration, and in [1, 12] and [13, 24] obtained by dividing by a window of $W_1=12$ in the iteration on the residual Δ after the first iteration. Likewise, the second term is a newly extracted pattern, and shows a pattern of E→E appearing in [1, 12] and [13, 24], respectively.

Figures 13, 14, 15:
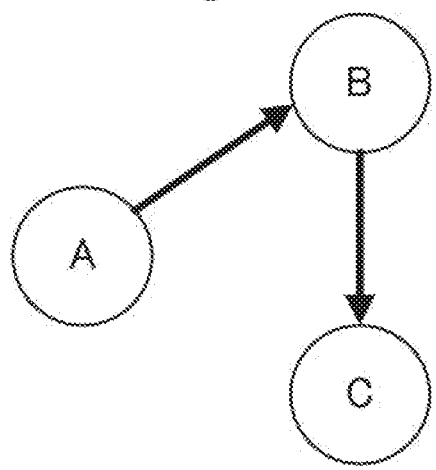
FIG. 13 is a view showing a residual portion derived from the data stream shown in FIG. 3 and the pattern shown in FIG. 12.
FIG. 14 is a view showing an example of a graph extracted from part of the residual portion of the data stream shown in FIG. 13.
FIG. 15 is a view representing the graph shown in FIG. 14 in matrix.
Figure 16:
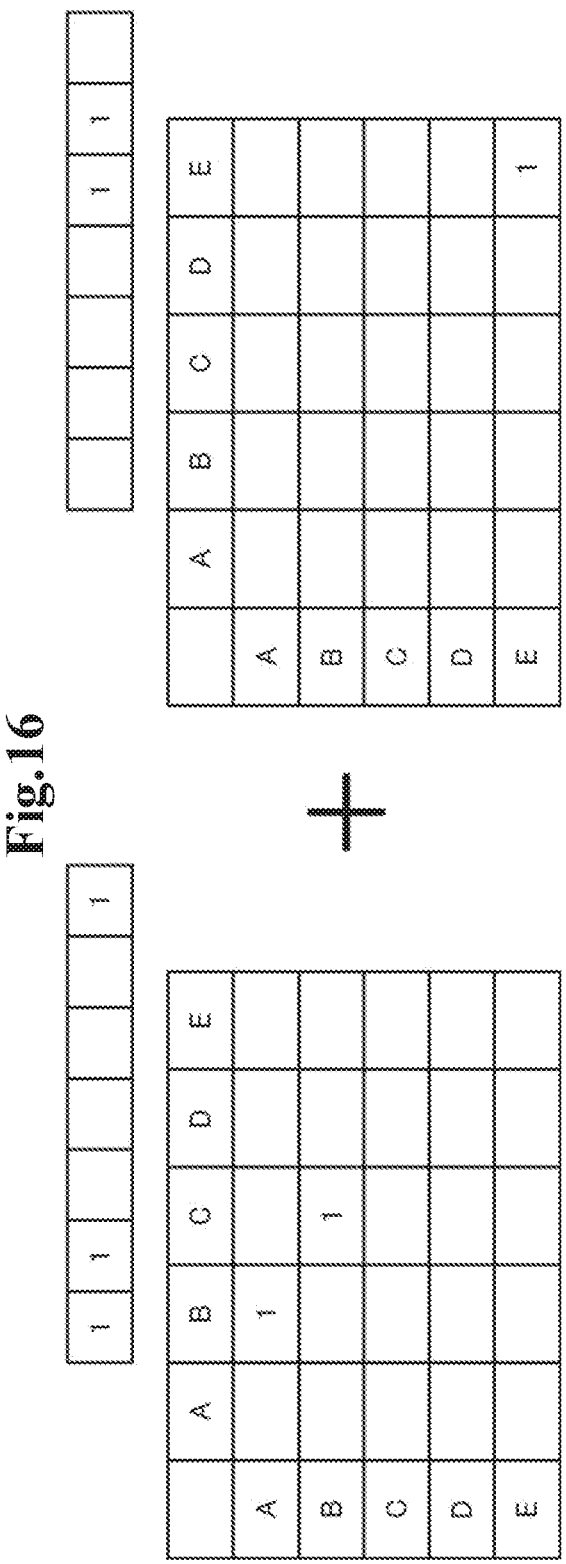
FIG. 16 is a view showing a pattern extracted from the pattern shown in FIG. 12 and the tensor generated from the matrix shown in FIG. 15.

After that, in the second iteration, the difference extraction part 107 obtains a residual Δ shown in FIG. 13. The convergence determination part 109 continues the processing because the number of tuples is sufficient for the residual Δ shown in FIG. 13.

Further, in the third iteration, the window length decision part 111 decides a new window length $W_2=24$, and the graph construction part 101 constructs a graph shown in FIG. 14 from the residual Δ shown in FIG. 13 by using the new window length to obtain a matrix shown in FIG. 15. Subsequently, the tensor construction part 103 generates a tensor Z obtained by stacking a tensor obtained from the previous pattern P shown in FIG. 12 and the matrix shown in FIG. 15, and the pattern extraction part 105 extracts a pattern P shown in FIG. 16.

Figures 17, 18:
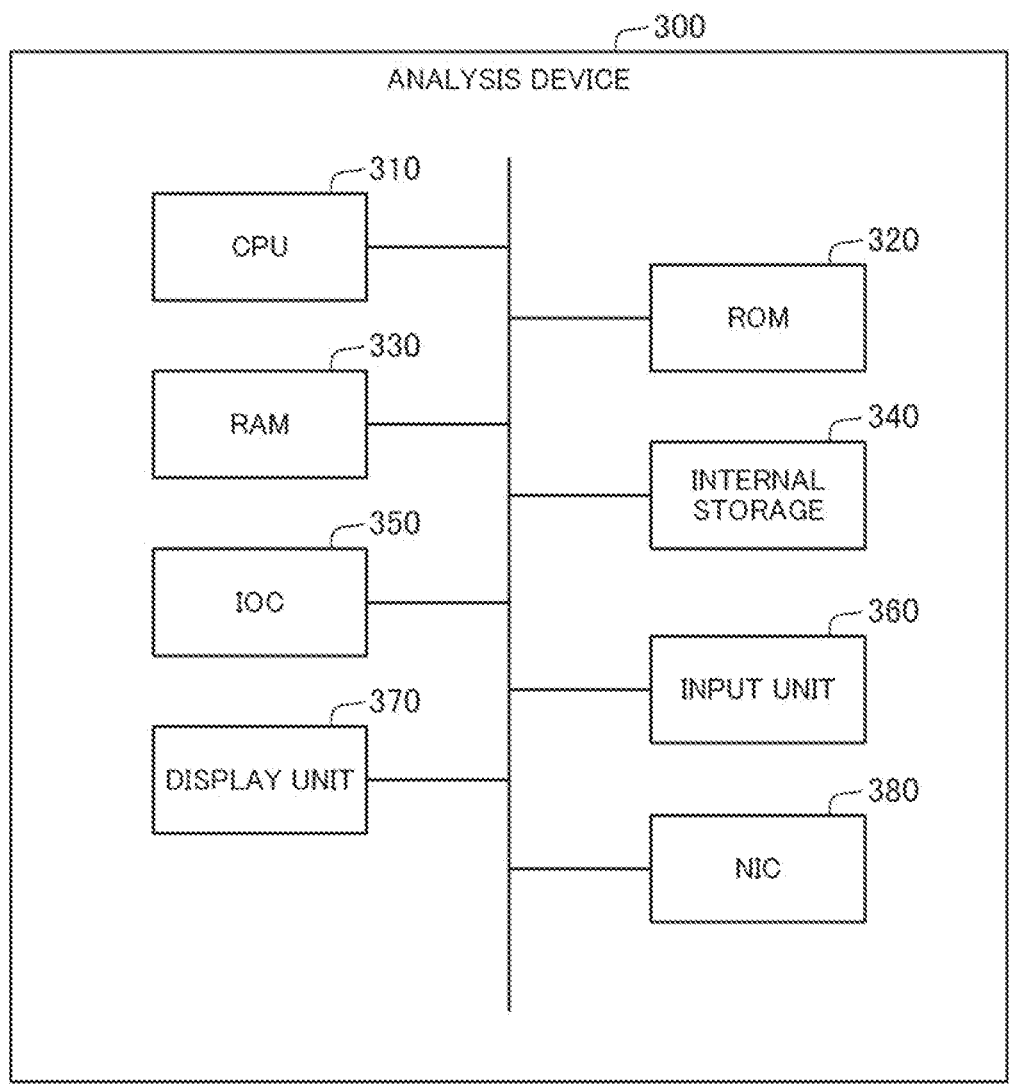
FIG. 17 is a view showing a residual portion derived from the data stream shown in FIG. 3 and the pattern shown in FIG. 16.
FIG. 18 is a block diagram showing the configuration of an analysis device in a second example embodiment of the present invention.

Then, the difference extraction part 107 extracts a residual Δ shown in FIG. 17. The convergence determination part 109 stops operation because the number of tuples in FIG. 17 is not sufficient for pattern extraction.

According to the present invention, it is possible to extract, as the same pattern, a plurality of events in which temporal distortion of appearance time and interval is occurring from a data stream. At this time, it is possible to extract a plurality of events with temporal distortion as the same pattern without setting a window length for each event Second Example Embodiment The analysis device 100 described above is configured in the following manner. For example, the respective components of the analysis device 100 may be configured by a hardware circuit. Alternatively, the respective components of the analysis device 100 may be configured by using a plurality of devices connected via a network. Moreover, a plurality of components of the analysis device 100 may be configured by a single hardware.

Further, an analysis device 300 may be realized as a computer device including a central processing unit (CPU), a read only memory (ROM), and a random access memory (RAM). The analysis device 300 may be realized as a computer device including an input/output circuit (IOC) and a network interface circuit (NIC), in addition to the above components.

FIG. 18 is a block diagram showing an example of the configuration of the analysis device 300 in the second example embodiment. The analysis device 300 includes a CPU 310, a ROM 320, a RAM 330, internal storage 340, an IOC 350, an input unit 360, a display unit 370 and an NIC 380, and configures a computer device.

The CPU 310 loads a computer program from the ROM 320. Then, the CPU 310 controls the RAM 330, the internal storage 340, the IOC 350 and the NIC 380 based on the loaded computer program. The computer including the CPU 310 controls these components and realizes the respective components as the graph construction part 101, the tensor construction part 103, the pattern extraction part 105, the difference extraction part 107, the convergence determination part 109, the window length decision part 111 and the pattern/graph conversion part 113.

The CPU 310 may use the RAM 330 or the internal storage 340 as temporal storage for a computer program at the time of realizing the respective functions.

Further, the CPU 310 may load a computer program included by a computer-readable storage medium in which the computer program is stored, by using a storage medium reading device that is not shown in the drawings. Alternatively, the CPU 310 may receive a computer program from an external device that is not shown in the drawings, stores the computer program into the RAM 330, and operates based on the stored computer program.

In the ROM 320, the computer program executed by the CPU 310 and static data are stored. The ROM 320 is, for example, a programmable ROM (P-ROM) or a flash ROM. In the RAM 330, the computer program executed by the CPU 310 and data are temporarily stored. The RAM 330 is, for example, a dynamic RAM (D-RAM). In the internal storage 340, data and a computer program that the analysis device 300 stores for a long time are stored. Moreover, the internal storage 340 may operate as temporary storage of the CPU 310. The internal storage 340 is, for example, a hard disk device, a magneto-optical disk device, a solid state drive (SSD), or a disk array device.

The ROM 320 and the internal storage 340 are non-transitory storage mediums. On the other hand, the RAM 330 is a transitory storage medium. Then, the CPU 310 can operate based on a computer program stored in the ROM 320, the internal storage 340, or the RAM 330. That is to say, the CPU 310 can operate by using a non-transitory storage medium or a transitory storage medium.

The IOC 350 mediates data between the CPU 310 and the input unit 360/the display unit 370. The IOC 350 is, for example, an IO interface card or a universal serial bus (USB) card. The input unit 360 is a unit which receives an input instruction from the operator of the analysis device 300. The input unit 360 is, for example, a keyboard, a mouse, or a touchscreen. The display unit 370 is a unit which displays information for the operator of the analysis device 300. The display unit 370 is, for example, a liquid crystal display.

The NIC 380 relays exchange of data with an external device that is not shown in the drawings via a network. The NIC 380 is, for example a local area network (LAN) card.

In the analysis device 300 thus configured, the CPU 610 can realize the same functions as the analysis device 100 described in the first example embodiment based on the computer program, so that it is possible to obtain the same effect as in the analysis device 100.

<Supplementary Notes>

Figure 19:
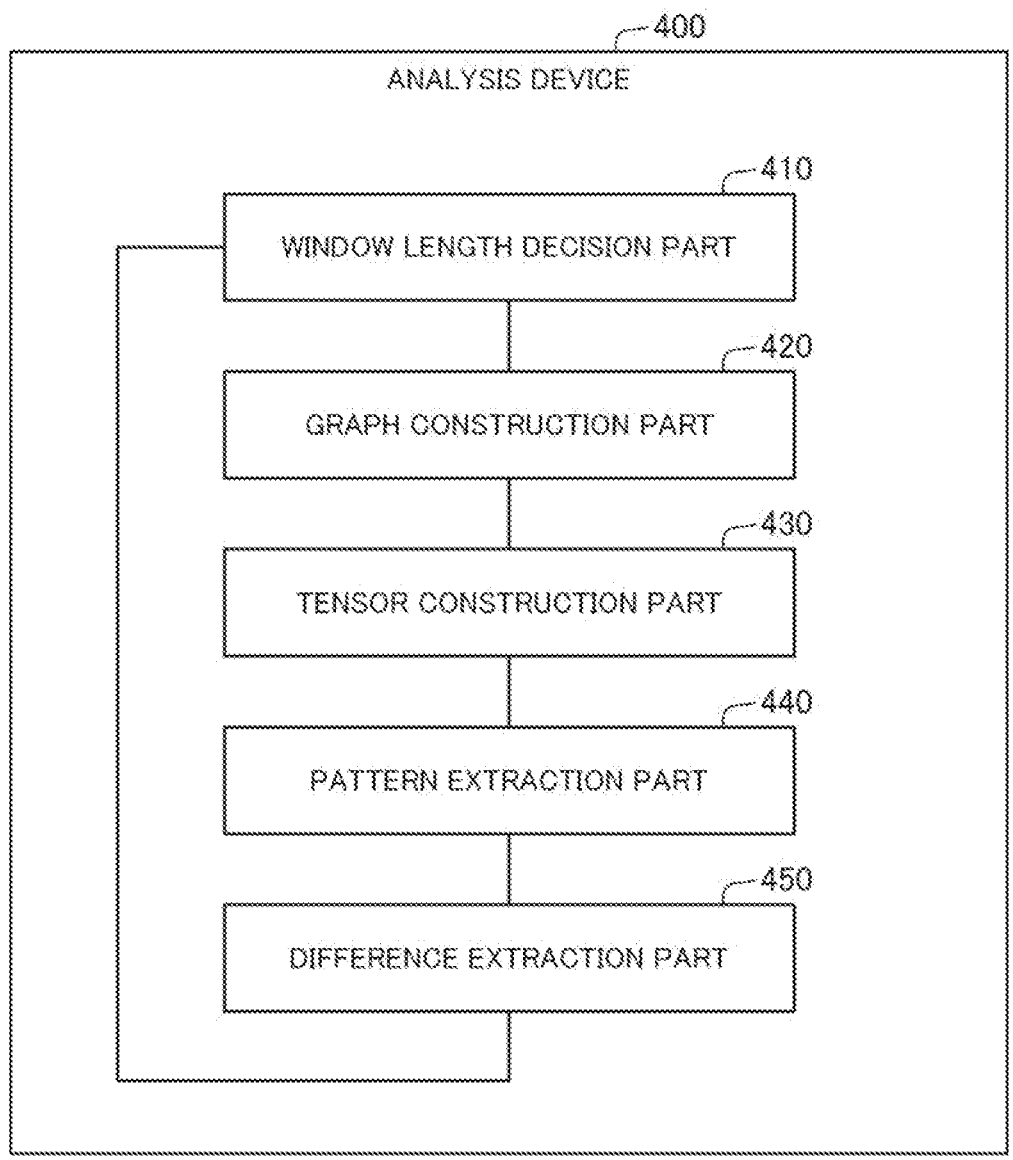
FIG. 19 is a block diagram showing the configuration of an analysis device in Supplementary Note 1 of the present invention.

The whole or part of the example embodiments disclosed above can be described as the following supplementary notes. Below, the outline of the configuration of an analysis device (see FIG. 19), a computer program and an analysis method according to the present invention will be described. However, the present invention is not limited to the following configurations.

(Supplementary Note 1)

An analysis device comprising:
a window length decision part configured to decide a window length of a data stream including tuples each including a timestamp and an observed value;
a graph construction part configured to construct a graph representing a preset relation between the tuples within a window obtained by dividing the data steam by the decided window length;
a tensor construction part configured to construct a tensor or a matrix equivalent to the tensor from a plurality of graphs constructed for a plurality of windows, respectively;
a pattern extraction part configured to extract a pattern from the tensor or the matrix equivalent to the tensor; and
a difference extraction part configured to extract a residual portion that does not match the extracted pattern, from the data stream, wherein:
the window length decision part is configured to decide a new window length that is different from the previously decided window length; and
the graph construction part is configured to construct a graph representing a preset relation between the tuples within a window obtained by dividing the residual portion extracted from the data stream by the new window length having been decided.

(Supplementary Note 2)

The analysis device according to Supplementary Note 1, further comprising a convergence determination part configured to determine whether or not processing on the data stream has converged based on the residual portion extracted from the data stream,
wherein, in a case where it is determined that the processing on the data stream has not converged, the window length decision part, the graph construction part, the tensor construction part, the pattern extraction part and the difference extraction part further operate.

(Supplementary Note 3)

The analysis device according to Supplementary Note 1 or 2, wherein the tensor construction part is configured to construct the tensor or the matrix equivalent to the tensor from the previously extracted pattern and the most recently constructed graph.

(Supplementary Note 4)

The analysis device according to any of Supplementary Notes 1 to 3, further comprising a pattern/graph conversion part configured to convert the extracted pattern to the graph.

(Supplementary Note 5)

The analysis device according to any of Supplementary Notes 1 to 4, wherein the pattern extraction part is configured to extract a pattern as a sparse vector, matrix, and tensor by using tensor decomposition that introduces sparse estimation.

(Supplementary Note 6)

The analysis device according to any of Supplementary Notes 1 to 5, wherein the graph construction part is configured to construct the graph representing a temporal relation between the tuples by a directed graph.

(Supplementary Note 7)

A computer program comprising instructions for causing an information processing device to realize:

a window length decision part configured to decide a window length of a data stream including tuples each including a timestamp and an observed value;

a graph construction part configured to construct a graph representing a preset relation between the tuples within a window obtained by dividing the data steam by the decided window length;

a tensor construction part configured to construct a tensor or a matrix equivalent to the tensor from a plurality of graphs constructed for a plurality of windows, respectively;

a pattern extraction part configured to extract a pattern from the tensor or the matrix equivalent to the tensor; and a difference extraction part configured to extract a residual portion that does not match the extracted pattern, from the data stream, the computer program also comprising instructions for causing the information processing device to realize that:

the window length decision part decides a new window length that is different from the previously decided window length; and the graph construction part constructs a graph representing a preset relation between the tuples within a window obtained by dividing the residual portion extracted from the data stream by the new window length having been decided.

(Supplementary Note 8)

The computer program according to Supplementary Note 7, further comprising instructions for causing the information processing device to realize a convergence determination part configured to determine whether or not processing on the data stream has converged based on the residual portion extracted from the data stream, the computer program further comprising instructions for causing the information processing device to realize that, in a case where it is determined that the processing on the data stream has not converged, the window length decision part, the graph construction part, the tensor construction part, the pattern extraction part and the difference extraction part further operate.

(Supplementary Note 9)

An analysis method comprising:

deciding a window length of a data stream including tuples each including a timestamp and an observed value;

constructing a graph representing a preset relation between the tuples within a window obtained by dividing the data steam by the decided window length;

constructing a tensor or a matrix equivalent to the tensor from a plurality of graphs constructed for a plurality of windows, respectively;

extracting a pattern from the tensor or the matrix equivalent to the tensor; and extracting a residual portion that does not match the extracted pattern, from the data stream, the analysis method further comprising:

deciding a new window length that is different from the previously decided window length, constructing a graph representing a preset relation between the tuples within a window obtained by dividing the residual portion extracted from the data stream by the new window length having been decided, and again executing the constructing the tensor, the extracting the pattern and the extracting the residual portion.

(Supplementary Note 10)

The analysis method according to Supplementary Note 9, comprising determining whether or not processing on the data stream has converged based on the residual portion extracted from the data stream and, in a case where it is determined that the processing on the data stream has not converged, again executing the deciding the new window length, the constructing the graph, the constructing the tensor, the extracting the pattern and the extracting the residual portion.

The abovementioned program is stored in a storage device or recorded on a computer-readable recording medium. For example, the recording medium is a portable medium such as a flexible disk, an optical disk, a magneto-optical disk, and a semiconductor memory.

Although the present invention has been described above with reference to the example embodiments, the present invention is not limited to the abovementioned example embodiments. The configurations and details of the present invention cannot be changed in various manners that can be understood by one skilled in the art within the scope of the present invention.

DESCRIPTION OF NUMERALS 100 analysis device
101 graph construction part
103 tensor construction part
105 pattern extraction part
107 difference extraction part
109 convergence determination part
111 window length decision part
113 pattern/graph conversion part
300 analysis device
310 CPU
320 ROM
330 RAM
340 internal storage
350 IOC
360 input unit
370 display unit
380 NIC
400 analysis device
410 window length decision part
420 graph construction part
430 tensor construction part
440 pattern extraction part
450 difference extraction part

What is claimed is:

1. An analysis device comprising:
a processor; and
memory storing executable instructions that, when executed by the processor, causes the processor to perform as:

a window length decision part configured to decide a window length of a data stream including tuples each including a timestamp and an observed value;

a graph construction part configured to construct a graph representing a preset relation between the tuples within a window obtained by dividing the data steam by the decided window length;

a tensor construction part configured to construct a tensor or a matrix equivalent to the tensor from a plurality of graphs constructed for a plurality of windows, respectively;

a pattern extraction part configured to extract a pattern from the tensor or the matrix equivalent to the tensor; and a difference extraction part configured to extract a residual portion that does not match the extracted pattern, from the data stream, wherein:

the window length decision part is configured to decide a new window length that is different from the previously decided window length; and the graph construction part is configured to construct a graph representing a preset relation between the tuples within a window obtained by dividing the residual portion extracted from the data stream by the new window length having been decided.

2. The analysis device according to claim 1, wherein the processor further causes the processor to perform as a convergence determination part configured to determine whether or not processing on the data stream has converged based on the residual portion extracted from the data stream, wherein, in a case where it is determined that the processing on the data stream has not converged, the window length decision part, the graph construction part, the tensor construction part, the pattern extraction part and the difference extraction part further operate.

3. The analysis device according to claim 1, wherein the tensor construction part is configured to construct the tensor or the matrix equivalent to the tensor from the previously extracted pattern and the most recently constructed graph.

4. The analysis device according to claim 1, wherein the processor further causes the processor to perform as a pattern/graph conversion part configured to convert the extracted pattern to the graph.

5. The analysis device according to claim 1, wherein the pattern extraction part is configured to extract a pattern as a sparse vector, matrix, and tensor by using tensor decomposition that introduces sparse estimation.

6. The analysis device according to claim 1, wherein the graph construction part is configured to construct the graph representing a temporal relation between the tuples by a directed graph.

7. A non-transitory computer-readable storage medium for storing a computer program comprising instructions for causing an information processing device to realize:

a window length decision part configured to decide a window length of a data stream including tuples each including a timestamp and an observed value;

a graph construction part configured to construct a graph representing a preset relation between the tuples within a window obtained by dividing the data steam by the decided window length;

a tensor construction part configured to construct a tensor or a matrix equivalent to the tensor from a plurality of graphs constructed for a plurality of windows, respectively;

a pattern extraction part configured to extract a pattern from the tensor or the matrix equivalent to the tensor; and a difference extraction part configured to extract a residual portion that does not match the extracted pattern, from the data stream, the computer program also comprising instructions for causing the information processing device to realize that:

the window length decision part decides a new window length that is different from the previously decided window length; and the graph construction part constructs a graph representing a preset relation between the tuples within a window obtained by dividing the residual portion extracted from the data stream by the new window length having been decided.

8. The non-transitory computer-readable storage medium for storing the computer program according to claim 7, the computer program further comprising instructions for causing the information processing device to realize a convergence determination part configured to determine whether or not processing on the data stream has converged based on the residual portion extracted from the data stream, the computer program further comprising instructions for causing the information processing device to realize that, in a case where it is determined that the processing on the data stream has not converged, the window length decision part, the graph construction part, the tensor construction part, the pattern extraction part and the difference extraction part further operate.

9. An analysis method comprising:

deciding a window length of a data stream including tuples each including a timestamp and an observed value;

constructing a graph representing a preset relation between the tuples within a window obtained by dividing the data steam by the decided window length;

constructing a tensor or a matrix equivalent to the tensor from a plurality of graphs constructed for a plurality of windows, respectively;

extracting a pattern from the tensor or the matrix equivalent to the tensor; and extracting a residual portion that does not match the extracted pattern, from the data stream, the analysis method further comprising:

deciding a new window length that is different from the previously decided window length, constructing a graph representing a preset relation between the tuples within a window obtained by dividing the residual portion extracted from the data stream by the new window length having been decided, and again executing the constructing the tensor, the extracting the pattern and the extracting the residual portion.

10. The analysis method according to claim 9, comprising determining whether or not processing on the data stream has converged based on the residual portion extracted from the data stream and, in a case where it is determined that the processing on the data stream has not converged, again executing the deciding the new window length, the constructing the graph, the constructing the tensor, the extracting the pattern and the extracting the residual portion.

11. The analysis method according to claim 9, comprising constructing the tensor or the matrix equivalent to the tensor from the previously extracted pattern and the most recently constructed graph.

12. The analysis method according to claim 9, further comprising converting the extracted pattern to the graph.

13. The analysis method according to claim 9, comprising extracting a pattern as a sparse vector, matrix, and tensor by using tensor decomposition that introduces sparse estimation.

14. The analysis method according to claim 9, comprising constructing the graph representing a temporal relation between the tuples by a directed graph.

\* \* \* \* \*